(12) United States Patent
Dodane et al.

(10) Patent No.: US 10,016,096 B2
(45) Date of Patent: Jul. 10, 2018

(54) KITCHEN UTENSIL WITH REMOVABLE HANDLE

(71) Applicant: CRISTEL, Fesches-le-Chatel (FR)

(72) Inventors: Paul Dodane, Fesches-le-Chatel (FR);
Emmanuel Brugger, Dasle (FR);
Pascal Drouville, Danjoutin (FR)

(73) Assignee: CRISTEL, Fesches-le-Chatel (FR)

( * ) Notice: Subject to any disclaimer, the term of this patent is extended or adjusted under 35 U.S.C. 154(b) by 0 days.

(21) Appl. No.: 15/582,659

(22) Filed: Apr. 29, 2017

(65) Prior Publication Data

US 2017/0319012 A1    Nov. 9, 2017

(30) Foreign Application Priority Data

May 3, 2016  (FR) ........................................ 1654008
Jun. 2, 2016  (FR) ........................................ 1655008

(51) Int. Cl.
| A47J 45/10 | (2006.01) |
| B65D 25/28 | (2006.01) |
| A47J 45/07 | (2006.01) |
| A47J 36/00 | (2006.01) |

(52) U.S. Cl.
CPC .................................. *A47J 45/071* (2013.01)

(58) Field of Classification Search
CPC .................................................... A47J 45/071
USPC ..................................... 220/573.1, 753, 759
See application file for complete search history.

(56) References Cited

U.S. PATENT DOCUMENTS

| 1,237,935 | A | * | 8/1917 | May | ........................ | A47J 45/07 |
| | | | | | | 220/759 |
| 1,268,089 | A | * | 6/1918 | Borsse | .................. | A47J 45/071 |
| | | | | | | 220/759 |
| 1,406,826 | A | * | 2/1922 | Dugger | .................. | A47J 45/071 |
| | | | | | | 220/759 |
| 2,712,151 | A | * | 7/1955 | Becht | .................... | A47J 45/071 |
| | | | | | | 220/759 |
| 4,206,853 | A | * | 6/1980 | Iten | ........................ | A47J 45/072 |
| | | | | | | 220/759 |
| 4,577,367 | A | * | 3/1986 | Durand | .................. | A47J 45/071 |
| | | | | | | 16/DIG. 24 |
| 6,250,493 | B1 | * | 6/2001 | Kwan | .................... | A47J 45/071 |
| | | | | | | 220/759 |
| 6,257,439 | B1 | * | 7/2001 | Hsu | ........................ | A47J 45/061 |
| | | | | | | 16/425 |

(Continued)

*Primary Examiner* — J. Gregory Pickett
*Assistant Examiner* — Niki M Eloshway
(74) *Attorney, Agent, or Firm* — Andrew W. Chu; Craft Chu PLLC

(57) ABSTRACT

The kitchen utensil includes a container and a handle. The outer upper perimeter of the container bears an extending retaining bracket provided with at least one opening for the engagement and reception of a hook-shaped end of a latching tab of the handle. The handle also bears a latch mounted slidingly and able to occupy at least an unlocked position and a locked position in which it is pushed back under the action of a return, to extend, on the opposite side relative to the latching tab, under the retaining bracket of the container. The latch is mounted sliding on the handle in a direction forming an acute angle relative to the plane of the retaining bracket so as to tighten toward the retaining bracket under the action of the return to the locked position.

7 Claims, 1 Drawing Sheet

(56) References Cited

U.S. PATENT DOCUMENTS

| | | | |
|---|---|---|---|
| 6,708,373 B2* | 3/2004 | Dodane | A47J 45/071 16/422 |
| 7,883,129 B2* | 2/2011 | Jung | A47J 45/10 220/759 |
| 2010/0288783 A1* | 11/2010 | Park | A47J 45/071 220/759 |

* cited by examiner

KITCHEN UTENSIL WITH REMOVABLE HANDLE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The invention relates to a kitchen utensil comprising a container and a handle, the outer upper perimeter of the container bearing an extending retaining bracket provided with at least one opening for the engagement and reception of a hook-shaped end of a latching tab of the handle, the latter also bearing a latch mounted slidingly and able to occupy at least an unlocked position and a locked position in which it is pushed back under the action of return means, to extend, on the side opposite the latching tab, under the retaining bracket of the container.

The present invention relates to the field of kitchen utensils, and more particularly those equipped with a removable handle.

2. Description of Related Art Including Information Disclosed Under 37 CFR 1.97 and 37 CFR 1.98

Many kitchen utensils are already known in the form of containers which, rather than being equipped with a fixed handle, include, substantially on their outer upper perimeter, a retaining bracket, quite often called a lug due to the shape of this bracket, on which a removable handle can be attached. Such a removable handle is of interest for multiple reasons. In particular, it can be removed from the container once the latter is positioned on a cooking plate so as to give it a smaller bulk. Furthermore, the removable nature of the handle greatly facilitates the storage of these kitchen utensils, as well as their cleaning, etc.

Thus, among these kitchen utensils with a removable handle, more particularly known are those whereof the retaining bracket on the upper edge of the container includes at least one opening, generally oblong, comparable to a slit, in which opening a hook-shaped end of a latching tab belonging to the handle will be able to engage, from above. Under this simple cooperation between this hook-shaped end of the latching tab of the handle and the corresponding opening in the lug of the container, it is possible to manipulate the latter using this handle.

However, to secure the latter on the retaining bracket of the container, a latch or lock is also provided, one end of which can extend below the retaining bracket of the container, when pushed back into the locked position. In short, in this locked position, the retaining bracket of the container extends between this lock and the latching tab of the handle. The latter is typically equipped, in the upper part, with a control button making it possible to act on this lock, quite frequently subjected to the action of elastic return means tending to push it back into its locked position.

Irrespective of the manufacturing quality respected, functional play remains between the handle and the retaining bracket of the container, giving the impression of insecurity and the risk of the handle detaching.

In this respect, a kitchen utensil comprising a container and a removable handle is already known from document FR 3,016,787. In this case, the retaining bracket equipping the container is provided with two housings each for receiving a tongue configured in the form of a hook equipping the retaining bracket of the handle. These tongues can be moved away from one another under the impulse of elastic return means, tending to push them back into a locked position, i.e., catching in the openings of this retaining bracket of the container.

Furthermore, a deformable member in the form of a crushable silicone pellet is inserted between the latching tab of the handle and the retaining bracket of the container when these elements are locked on one another.

In short, between the moment when the handle is attached on the container and before one is locked on the other, this silicone pellet is separated so as to react the functional play typical between these elements.

It should be noted that in document FR 3,016,788, a similar state of the art is described, with the exception that the silicone pellet is provided with a centering spur in its center, provided to be housed in a matching cavity arranged on the retaining bracket of the container.

Although such a silicone pellet resolves the issue of reacting play between the removable handle and the container of the kitchen utensil, it makes the cooperation of these parts somewhat restrictive.

Indeed, when ensuring this cooperation, it is necessary to ensure that this pellet is crushed before the latching tab of the handle is locked on the retaining bracket of the container. In order to obtain this crushing, it is necessary to exert a certain pressure on this fastening tab using the handle, which may result in tilting of the container, and therefore a risk of spilling.

The unlocking operation is therefore also more difficult. To that end, this crushed silicone pellet substantially increases the frictional forces between the retaining bracket and the lock, creating a greater unlocking control force.

BRIEF SUMMARY OF THE INVENTION

The present invention aims to resolve the drawbacks of this state of the art.

In the context of a first inventive approach, it is been considered that the reaction of the play between the latching tab of a handle and the retaining bracket of a container results, at least in part, from a gripping effect procured by the lock of the latching tab of the handle on the retaining bracket of the container.

More particularly, this gripping effect may result from a movement of this lock in a direction not parallel to the fastening plane.

In a complementary manner, it has also been considered to associate the hook-shaped end of the latching tab and/or the opening in the retaining bracket for receiving this hook-shaped end with a deformable damping element serving to absorb the functional play, which is often essential to allow the cooperation of these parts.

The advantages of the present invention consist of the reaction of the play between the handle and the container resulting essentially from a gripping action under the impulse of the return means, for example elastic, of the lock on the retaining bracket of the container, in cooperation with the latching tab of the handle, no additional force needing to be produced to provide this cooperation between the handle and the container, compared with the prior solution where the lock does not work by such gripping action.

Likewise, in the absence of any pre-stressed deformable member between the handle and the container, the unlocking control remains just as easy.

To that end, the invention relates to a kitchen utensil comprising a container and a handle, the outer upper perimeter of the container bearing an extending retaining bracket or lug provided with at least one opening for the engagement and reception of a hook-shaped end of a latching tab of the handle, the latter also bearing a latch mounted slidingly and able to occupy at least an unlocked position and a locked position in which it is pushed back under the action of return means, to extend, on the side opposite the latching tab, under the retaining bracket of the container, characterized in that the latch is mounted sliding on the handle in a direction forming an acute angle relative to the retaining brackets so as, from an unlocked position, separated from this retaining bracket, to tighten directly on the latter under the action of said return means to the locking position.

Advantageously, but not necessarily, the return means are of the elastic type.

According to another particularity of the present invention, the hook-shaped end of the latching tab of the handle and/or the opening in the retaining bracket for receiving said end is provided with a deformable damping element able to absorb the functional play.

BRIEF DESCRIPTION OF THE SEVERAL VIEWS OF THE DRAWINGS

Other aims and advantages of the present invention will appear during the following description, relative to one example embodiment provided for information and non-limitingly.

The understanding of this description will be facilitated in reference to the attached drawings.

DETAILED DESCRIPTION OF THE INVENTION

Figure 1:
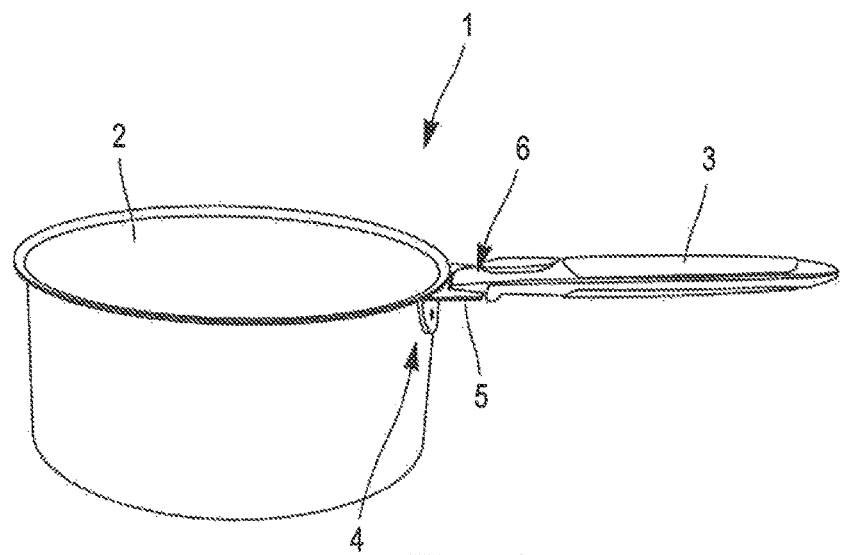
FIG. 1 is a schematic perspective view of a kitchen utensil according to the invention.

As shown in the figures of the attached drawing, the present invention pertains to a kitchen utensil (1) comprising a container (2) and a handle (3). On the outer upper perimeter (4) of the container (2), at least one retaining bracket (5), also often called lug, extends, with which a latching tab (6) at one end (7) of the handle (3) cooperates.

Figure 2:
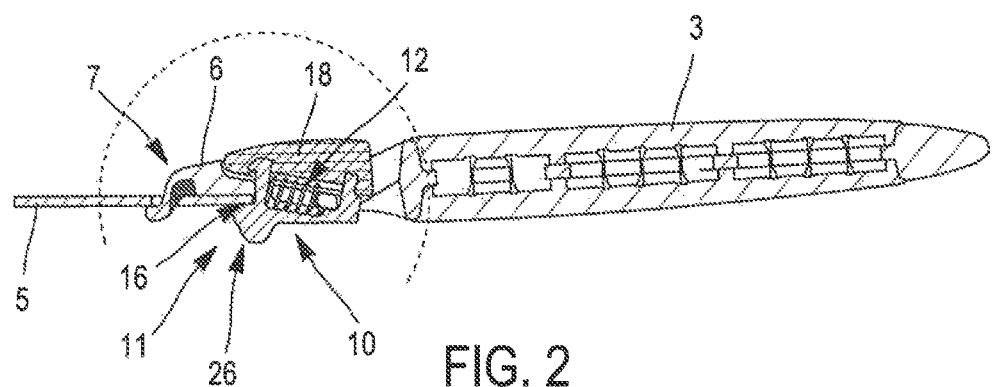
FIG. 2 is a partial sectional schematic view of the handle cooperating with the retaining bracket of the container (not shown) of the kitchen utensil according to the invention.
Figure 3:
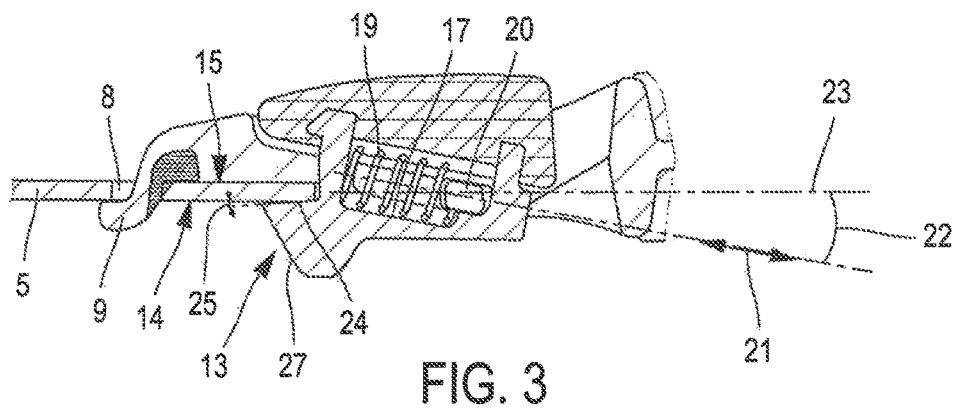
FIG. 3 is a detailed schematic view of FIG. 2.

In reference more particularly to FIGS. 2 and 3, the retaining bracket (5) includes at least one opening (8), generally oblong and preferably extending tangentially to the container (2), or even coaxially inasmuch as this opening (8) can adopt a rectilinear or curved shape.

This opening (8) is provided for the engagement and reception of a hook-shaped end (9) of the latching tab (6) corresponding to the handle (3).

On the latter, preferably, but non-limitingly, on the latching tab (6), a latch (10) is slidingly mounted able to occupy at least an unlocked position (not shown in the figures) and a locked position (11) in which it is pushed back under the action of return means (12).

Specifically, in this locked position (11), this latch (10) extends, more particularly through its end (13), below the retaining bracket (5), in short on the opposite side (14) relative to that (15) above which the latching tab (6) extends.

In the illustrated embodiment, the latch (10) cooperates with the peripheral edge (16) of the retaining bracket (5). It should, however, be noted that the present invention is not limited to such an embodiment.

More particularly, the latch (10) extends below the latching tab (6) while being mounted sliding in a housing (17) in the form of an opening in this latching tab (6). Furthermore, the body of this latch (10) extends through this housing (17) and a control button (18) is secured to it, preferably made from a thermally insulating material.

Thus, through the control button (18), accessible on the top of the latching tab (6), the user can push the latch (10) back into its unlocked position, against the action of said return means (12).

It should in particular be noted in this regard that these return means (12) can be of the elastic type, and in particular assume the form of a spring, knowing that they can also assume other embodiments. As an example, such return means (12) can be made up of one or several magnets, in particular two magnets acting by opposition. Thus, under the action of the unlocking command, one of these magnets, supported by the latch, can come closer to another stationary magnet mounted in magnetic opposition, such that by releasing the unlocking command, these magnets push one another back while returning the latch to its locked position.

Many other embodiments of these return means (12) can be considered, while being within the reach of one skilled in the art, in particular the use of an electromagnetic actuator, or even motor.

Returning to the non-limiting example embodiment of the invention, as illustrated in FIGS. 1 to 3, these return means (12) are of the elastic type and shown by a spring (19) positioned substantially in the housing (17) while being inserted between the latch (10) and a stop (20) arranged in this housing (17) to be able to perform its function of returning said latch (10) to the locked position (11).

According to the invention, the latch (10) is mounted sliding on the handle (3) in a direction (21) forming an acute angle (22) relative to the plane (23) of the retaining bracket (5) so as, starting from an unlocked position, separated from said retaining bracket (5), to tighten toward the latter under the action of the return means (12) to the locked position.

According to one advantageous embodiment, at its end (13), the latch (10) includes a bearing surface (24) intended to cooperate with the opposite side (14) of the retaining bracket (5) while pushing the latter back toward the latching tab (6) of the handle (3). Preferably, this bearing surface (24) forms, in this locked position (11), an undercut angle (25) with this opposite side (14) of the retaining bracket (5), so as to avoid any corner effect under the action of the latch (10).

According to still another advantageous embodiment, the latch (10), at this end (13) intended to cooperate with the retaining bracket (5), includes, on its lower side (26), an engaging bevel (27). Through the latter, the latch (10) is naturally pushed back in its unlocked direction in contact with the retaining bracket (5), when the handle (3) is engaged on the container (2).

According to still another particularity of the present invention, depending on the case on the hook-shaped end (9) of the latching tab (6) and/or in the opening (8) in the retaining bracket (5) for receiving said end (9), a deformable damping element (28) is arranged intended to absorb the functional play between this hook-shaped end (9) and said opening (8).

Thus and as shown in FIGS. 2 and 3, this deformable damping element (28) can be associated with the latching tab (6) substantially in the rotation angle between the handle (3) and the retaining bracket (5). Situated precisely at the height of this rotation angle, this element (28) made from a deformable material has no stress, whether during the placement or removal of the handle (3).

The advantages resulting from the present invention essentially consist of the absence of play between the handle and the container, without the placement of the handle requiring stressing any deformable element. Furthermore, the locking command can be done with the same ease as a handle not performing any play reacting function.

We claim:

1. A kitchen utensil, comprising:
    a container 2 having an outer upper perimeter;
    an extending retaining bracket 5 being mounted on said outer upper perimeter of said container and having a top side 15, a bottom side 14, and an opening 8; and
    a handle 3 being comprised of:
        a latching tab 6 with a hook-shaped end 9;
        a latch 10 being slidable between an unlocked position and a locked position; and
        a return means 12 for said latch between said unlocked position and said locked position,
    wherein said unlocked position comprises said hook-shaped end of said latching tab inserted through said opening, said return means in a retracted configuration, said latch being set back along said bottom side of said extending retaining bracket,
    wherein said locked position comprises said hook-shaped end of said latching tab inserted through said opening, said return means in an extended configuration, said latch tightening said latching member to said top side of said extending retaining bracket and said latch to said bottom side of said extending retaining bracket, and
    wherein said latch is slidable at an acute angle 22 relative to a plane 23 of said extending retaining bracket between said locked position and said unlocked position.

2. The kitchen utensil, according to claim 1, further comprising: a deformable damping element between said hook-shaped end of said latching table and said opening, said deformable damping element facing said latch.

3. The kitchen utensil, according to claim 1, wherein said latch is further comprised of a bearing surface 24 cooperative with said bottom side of said extending retaining bracket in said locked position, said bearing surface forming an undercut angle 25 with said bottom side of said extending retaining bracket.

4. The kitchen utensil, according to claim 1, wherein the return means are elastic.

5. The kitchen utensil, according to claim 4, wherein said latch is further comprised of a housing 17, said latching tab extending into said housing; and a control button secured to the latching tab, said control button 18 being comprised of a thermally insulating material.

6. The kitchen utensil, according to claim 1, wherein said latch is comprised of a housing 17, said housing extending below said latching tab 27 in said locked position, said unlocked position, and between said locked position and said unlocked position.

7. The kitchen utensil, according to claim 6, wherein the return means is comprised of a spring 19 positioned in said housing, and a stop arranged in said housing, said spring being between said latching tab and said stop.

* * * * *